July 6, 1965 YOSHIAKI NAKAYAMA ETAL 3,193,721

IMAGE MAGNIFICATION VARYING MEANS FOR PHOTOELECTRONIC IMAGE DEVICES

Filed Aug. 10, 1962 5 Sheets-Sheet 2

July 6, 1965 YOSHIAKI NAKAYAMA ETAL 3,193,721

IMAGE MAGNIFICATION VARYING MEANS FOR PHOTOELECTRONIC IMAGE DEVICES

Filed Aug. 10, 1962 5 Sheets-Sheet 5

United States Patent Office 3,193,721 Patented July 6, 1965

3,193,721

IMAGE MAGNIFICATION VARYING MEANS FOR PHOTOELECTRONIC IMAGE DEVICES

Yoshiaki Nakayama, Ota-ku, Tokyo, and Shoichi Miyashiro, Kanagawa-ku, Yokohama, Japan, assignors to Tokyo Shibaura Electric Co., Ltd., Horikawacho, Kawasaki-shi, Japan, a corporation of Japan Filed Aug. 10, 1962, Ser. No. 216,238
Claims priority, application Japan, Aug. 15, 1961, 36/28,899, 36/28,900, 36/41,431, 36/41,432
6 Claims. (Cl. 315—10)

The present invention relates to photoelectronic image devices using electron tubes such as television pickup-tubes, image intensifier tubes, image converter tubes and the like.

The present invention is useful and effective especially for television pick-up devices employing a camera tube having a so-called electron image section of electromagnetic electron lens type such as an image orthicon tube, so that the following description will be presented mainly in connection with an image orthicon camera but an underlying principle of the present invention is not limited only to the image orthicon camera itself. The electron image section of the image orthicon has a photocathode having a photoelectric light sensitivity such as to emit photoelectrons in accordance with the light intensities present in an optical image focused on the photocathode, said photoelectrons being drawn to impinge on a charge storage target to form a pattern of charge image thereon. The image section includes a means for forming an electromagnetic field which acts to direct the photoelectrons leaving the photocathode along the lines of magnetic force to the storage target.

In television pickup devices of this type, an optical image is focused on the photocathode by an optical lens system arranged in front of the photocathode.

In previous television pickup devices, the electromagnetic field formed in the electron image section of the pickup tube has been set at a definite level of intensity and the magnification of the optical image focused on the photocathode has been varied by means of an optical lens system including, for example, a zoom lens for obtaining an output image of continuously variable magnification or a turret lens for changing the output image size stepwise. In television cameras, where the pickup device employs an optical lens system in the form of a zoom lens or a turret lens (including a telescopic lens, etc.), an extremely large proportion of the bulk of the camera is accounted for by such optical lens system, which complicates the camera structure considerably. This is disadvantageous from the standpoint of mobility, ease in operation and maintenance of the camera, which are essential considerations in designing television cameras. In addition, recent progress in the design of electric circuit components and particularly transistorization thereof have furthered reduction in size of television cameras, naturally requiring miniaturization of the optical lens system used in such camera.

The present invention has for its object to provide a photoelectronic device such as a television pickup device in which the electron image section of the pickup tube is adapted to form an electromagnetic field having a variable intensity while focusing a light image of a definite magnitude on the photocathode, for example, by an optical lens system for such focusing, thereby to obtain on the storage target a charge image variable in magnification. Such television pickup device according to one aspect of the present invention may be obtained by arranging in front of the photocathode an auxiliary magnetic field generating means in the form of an auxiliary coil ring adapted to produce in the image section a magnetic field variable with a continuous or discontinuous variation in the magnitude of the current flowing through the auxiliary coil ring while varying the respective potentials of the electrodes in the image section thereby to vary the magnification of the charge image formed on the charge storage target in the zoom or turret fashion.

Another object of the present invention is to eliminate the above-described deficiencies of previous television cameras by employing a permanent magnet ring in place of the above auxiliary coil ring for producing a magnetic field which acts to magnify the charge image formed on the charge storage target enabling the optical lens system to be reduced in size.

A further object of the invention is to provide a miniaturized television pickup device by employing an auxiliary magnetic field generating means in the form of an auxiliary coil ring or a permanent magnet ring as set forth above in place of a retainer ring previously used for holding the pickup tube in place.

Other objects and advantages will become apparent from the following detailed description, reference being had to the accompanying drawings in which.

Figure 1:
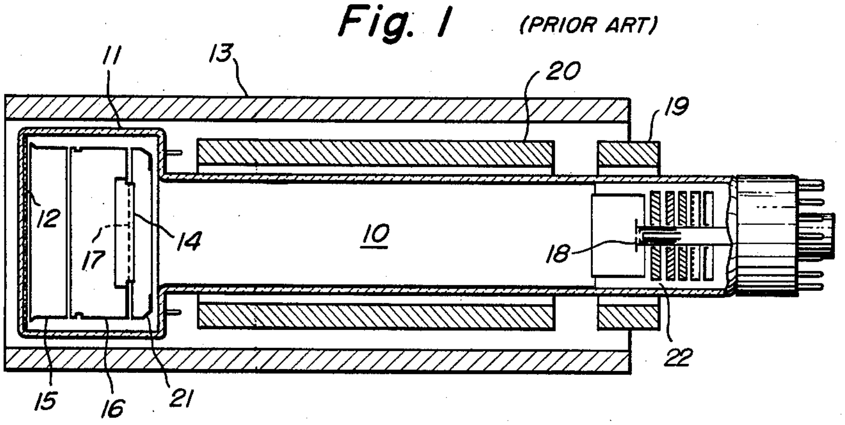
Fig. 1 (PRIOR ART)
FIG. 1 is a longitudinal cross section of a conventional form of television pickup device.

Referring first to FIG. 1, which illustrates a conventional form of television pickup device including pickup tube 10 having an electron image section. The pickup tube 10 shown takes the form of a so-called 3-inch type image orthicon having an envelope 11 formed, for example, of glass with a semi-transparent photocathode 12 formed on the inside of the front wall of the envelope. In operation of this pickup tube, a light image of the scene being picked up is focused on the photocathode 12 by means of an optical lens system not shown so that photoelectrons are emitted from the photocathode. The numbers of the photoelectrons leaving the photocathode are proportional to the intensity of the illumination at each point in the light image focused thereon. A focusing coil 13 is arranged to encircle the envelope 11 coaxially therewith for producing a uniform magnetic field therein which draws the photoelectrons along spiral paths substantially in parallel relation with the lines of magnetic force to a focus on a charge storage target 14 including a glass membrane. These photoelectrons are also accelerated by annular electrodes 15 and 16 toward the target 14 so that each photoelectron hits the target 14 at a sufficiently high energy level to knock additional or secondary electrons from the target 14. A wire mesh screen or target mesh 17 is provided in front of and closely adjacent to the target 14 to collect the secondary electrons leaving the target glass. The emission of secondary electrons from the surface of the target 14 produces thereon a pattern of positive charges which corresponds to the light image focused on the photocathode 12. The target 14 is extremely limited in thickness so that there is also produced a corresponding potential pattern on the opposite surface of the target which is remote from the photocathode. The operation of the electron image section of the pickup tube will be described hereinafter in more detail with reference to FIG. 3.

Referring further to FIG. 1, an electron gun 18 is arranged in the camera tube at its end opposite to the photocathode 12 for generating a beam of electrons, which is made to scan the rear surface of the target 14, i.e. the target surface to which the electron gun is directed. In more detail, the electron beam is first aligned by a set of alignment coils 19 and then focused on the target 14 by a focusing coil 13. A deflecting coil assembly 20 is provided to produce varying magnetic fields for deflecting the electron beam so that the target surface is scanned thereby. As the electron beam comes near to the target 14, it is retarded by an annular retarding electrode 21 to substantially zero speed. Some of the electrons in the beam neutralize the positive charges built up on the target reducing them to the potential of the electron gun cathode and thus the electrons following thereafter turn about and return to the electron gun 18. When the beam scans an uncharged area of the target, the full beam is returned. The return beam is amplified in the secondary electron multiplier section 22 and is taken out to the exterior of the pickup tube as an image signal or a video output signal.

Figure 3:
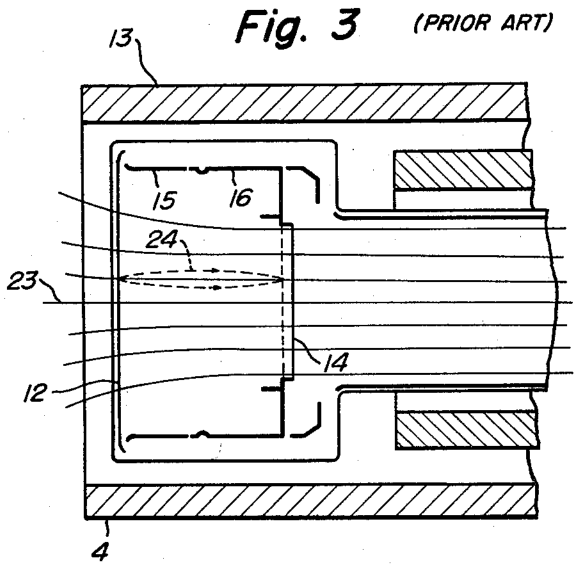
FIG. 3 is a fragmentary schematic view of the conventional pickup device of FIG. 1 showing the manner in which the device operates.
Figure 4:
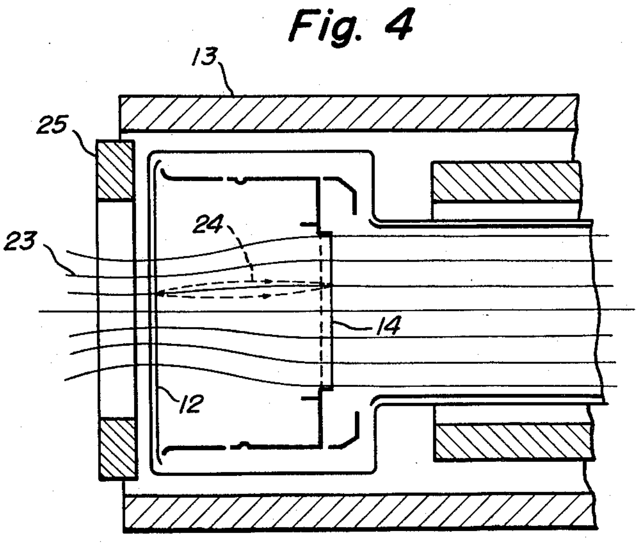
FIGS. 4 and 5 are fragmentary schematic views of the inventive television pickup device of FIG. 2 showing different phases of operation of the device.

FIG. 3 illustrates the configuration of the magnetic field produced by the focusing coil 13 in the image section of the pickup tube. As seen in FIG. 3, the lines of magnetic force in the image section extend substantially parallel to the axis of the tube slightly diverging adjacent the open end of the focusing coil to reduce the magnetic flux density thereabout. When the photocathode 12 and the annular electrodes 15 and 16 are energized to respective required potentials, an electrical field, produced thereby acts upon each photoelectron 24 emitted from the photocathode 12 to direct it along a spiral path having an axis extending substantially in parallel with the lines of magnetic force to be focused on the target 14. On this occasion, it has been found theoretically and experimentally that the number $n$ of elementary loops forming the spiral path between the photocathode and the target, i.e., the so-called degree of focusing mode is given approximately by the following formula:

$$n=0.0472\int_0^L \frac{H(z)}{\sqrt{E(z)}}dz \qquad (1)$$

where $z$ represents a coordinate taken along the tube axis with the origin placed on the photocathode, $E(z)$ represents the potential in volts as measured relatively to the photocathode, $H(z)$ represents the magnetic flux density in gausses, and L represents the distance from the photocathode to the target in centimeters. For example, with a 3-inch image orthicon tube, the focusing mode generally corresponds to $n=1$ and the ratio of the magnitude of the charge image on the target to the light image on the photocathode is about 0.85.

Figure 2:
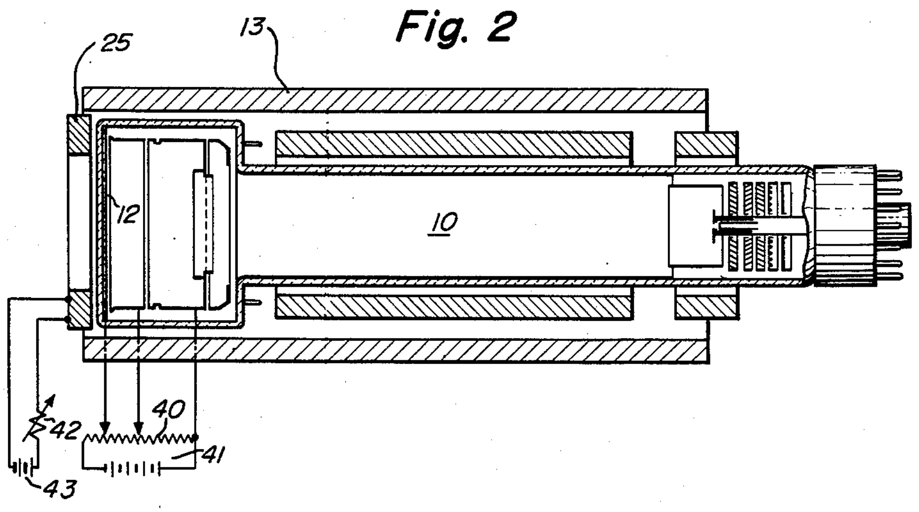
FIG. 2 is a view similar to FIG. 1 of a television pickup device according to the present invention.

FIG. 2 illustrates one preferred form of camera pickup device according to the present invention which is different from the one illustrated in FIG. 1 in that an auxiliary magnetic field generating means 25 is arranged at the open end of the focusing coil 13 in the close vicinity of the photocathode 12 of the pickup tube 10. The magnetic field produced by the auxiliary magnetic field generating means 25 cooperates with the magnetic field formed by the focusing coil 13 to vary the configuration of the lines of magnetic force in the electron image section. It will be appreciated, therefore, that as long as the magnetic flux density in the electron image section is variable as desired, the charge image obtained on the target 14 may be varied in magnitude as desired even though a definite light image is formed on the photocathode. However, sheer variation of the magnetic flux density in the electron image section, precluding the photoelectrons emitted thereby from being focused on the target, reduces the resolution of the charge image on the target and invites the occurrence of an S type or reversed S type image distortion or a so-called ghost image, further causing the picture to be inclined. It is necessary, therefore, to apply a proper voltage to the photocathode 12 as well as to the annular electrodes 15 and 16 in a manner such that a charge image is formed on the target precisely corresponding to the light image on the photocathode. The voltage arrangement upon these electrodes may be given by the above Formula 1. Voltages are applied to each of the electrodes, namely to the photocathode 12 and the annular accelerating electrodes 15 and 16 by a power battery 41 across which potentiometer 40 is connected.

Variation desired of the magnetic flux density in the electron image section is made possible by employing an auxiliary coil ring 25 as auxiliary magnetic field generating means. The auxiliary coil ring 25 is connected to a D.C. power source 43 which has a variable resistor 42 separate from that to which the focusing coil 13 and other magnetic field generating means are connected and thus the supply current to the coil ring 25 may be set at will. The magnetic flux density in the electron image section is varied as the current through the coil ring 25 is varied continuously or discontinuously. It will thus be appreciated that the charge image formed on the target may be varied in magnitude as desired relatively to the definite light image focused on the photocathode by arranging a required voltage on each of the electrodes in the image section to correspond to the variation of the magnetic flux density.

Figure 5:
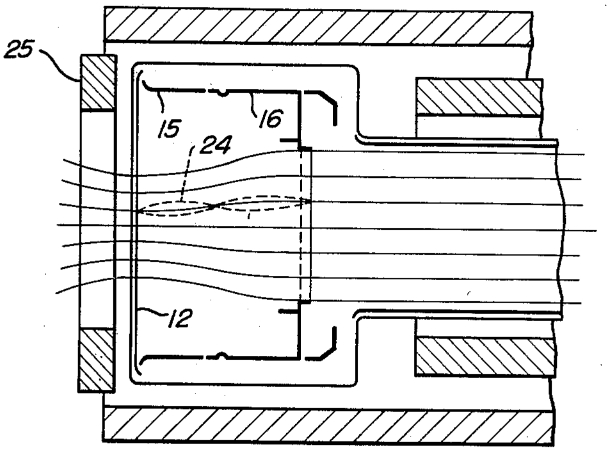

In this operation of varying image magnitude, the number of loops in the spiral path along which each photoelectron runs in the direction of the line of magnetic force, that is, the focusing degree $n$ as determined approximately from the Formula 1, is preferably set at a certain integer value of $n$ in accordance with the tube design such as the image section length. For instance, in the case of 3 inch type image orthicon, such $n$ is 2 as illustrated in FIG. 5. Such focusing pattern, including two successive loops in each electron path from the target to the photocathode, may be obtained by employing on the photocathode 12 and annular electrodes 15, 16 voltages which correspond to about one-fourth of those for the focusing pattern of degree $n=1$. Similarly, the focusing pattern of degree $n=3, 4 \ldots$ may be obtained by reducing the voltages of these electrodes to approximately $1/9$, $1/16$ . . . .

As the magnetic flux density in the vicinity of the photocathode 12 is varied, the configuration of the lines of magnetic force varies to cause each photoelectron to follow a varying orbit. On this occasion, the focusing degree or the number of loops forming the electron path may be of 1, 2, 3 . . . .

Figure 8:
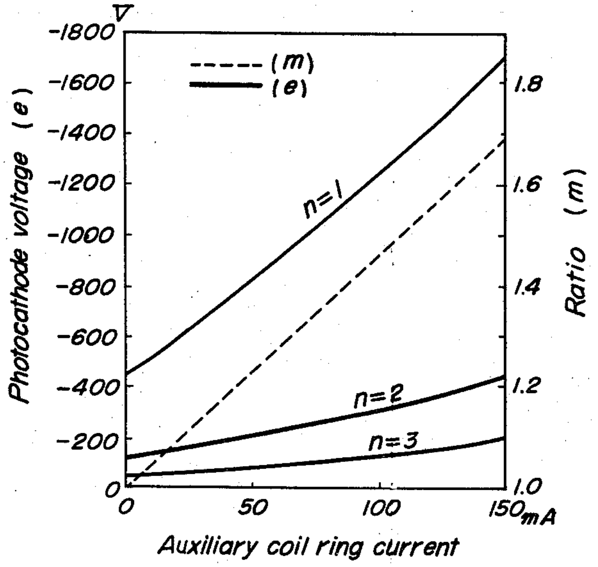
FIGS. 8 to 10 are graphical representations of certain operating characteristics of the television pickup device according to the present invention.

The chart of FIG. 8 illustrates the magnitude of the auxiliary coil ring current suitable for obtaining a required zooming ratio or ratio of the required continuously variable image magnification to the image magnification obtained when no current flows through the auxiliary coil ring 25. The chart also illustrates the necessary voltage $e$ of the photocathode 12 for the focusing modes $n=1$, 2 and 3. The pickup tube used was a 3-inch image orthicon and the focusing coil 13 was supplied with a current of 75 ma., the annular electrodes 15 and 16 having a voltage 0.72 times as high as that of the photocathode 12.

Figure 9:
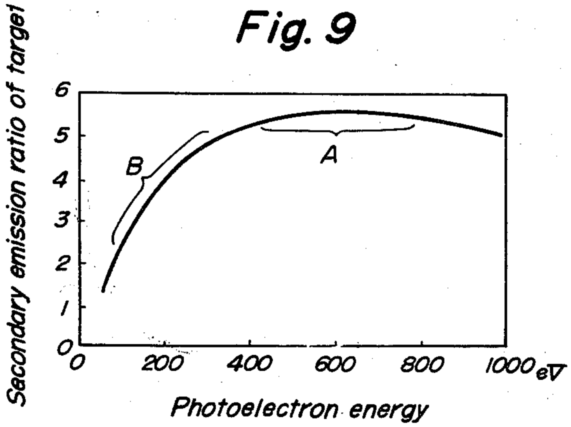

It is observed that for the focusing pattern $n=1$ the photocathode voltage $e$ exceeds $-1{,}000$ volts even with a slight increase in zooming ratio $m$. Application of such high voltage is undesirable from the standpoint of the withstand voltage characteristic of the tube as well as of the circuit for supplying the voltage. On the other hand, for the focusing mode $n=2$, the photocathode voltage may be limited within a range from approximately $-110$ volts to minus several hundred volts not causing any inconvenience from the standpoint of the withstand voltage characteristic of the tube and the circuit, and thus where a conventional camera is modified to obtain a zooming effect, the existing power source may be utilized. A further advantage in use of the focusing mode of $n=2$ is that virtually no aperture adjustment is required with the optical lens system for the zooming procedure. As the zooming ratio is increased, the utilizable area of the photocathode and hence the number of photoelectrons reaching the target are decreased and this appears to make it impossible to charge the target to the required potential. In this connection, FIG. 9 illustrates the typical relationships between the photoelectron energy $eV$ and the secondary emission ratio of the target. For the focusing mode $n=1$, the photocathode voltage used and hence the photoelectron energy are high and the tube operates at the region A, where the secondary emission ratio of the target is saturated, as shown. Even with use of a higher voltage, any increase in the secondary emission ratio can hardly be expected. This means that with increase in the zooming ratio the aperture of the optical lens system must be adjusted to increase the number of photoelectrons emitted. On the other hand, where the zooming is effected for the mode $n=2$, substantially a constant signal output can be obtained even when the aperture of the optical lens system is kept unchanged. This is because the tube is operated at the region B, as illustrated in FIG. 9. That is, in this case, as the photocathode voltage is raised with the increase in the zooming ratio, the secondary emission ratio of the target is increased automatically compensating for the decrease in the flow of photoelectrons. It has also been found experimentally that the tube characteristics relating to the image resolution and distortion, occurrence of a so-called ghost image and the inclination of the whole picture when the zooming procedure is taken are excellent for the focusing mode $n=2$ as compared with those for the mode $n=1$. Meanwhile, where the focusing mode $n=3$ is used, there is no problem with respect to the withstand voltage characteristic but the photocathode voltage and hence the energy of the photoelectrons hitting the target are lowered so as to decrease the secondary emission ratio of the target to such an extent that the overall sensitivity of the tube is lowered, rendering the use of the focusing mode $n=3$ impractical as compared with the mode $n=2$. Though the tube operation has been described herein primarily in connection with the continuous variation of image magnification, the tube operation when the image magnification is discontinuously varied is substantially the same with the case where the magnification is varied continuously.

Discontinuous variation of the image magnification may also be effected in the following manner. As described above, when the electrode voltages are each reduced to approximately one-fourth of those required for the focusing mode $n=1$, the focusing mode $n=2$ is obtained, and similarly the focusing modes $n=3, 4 \ldots$ are obtained by reducing the electrode voltages to approximately $\frac{1}{9}, \frac{1}{16} \ldots$ respectively.

Figure 10:
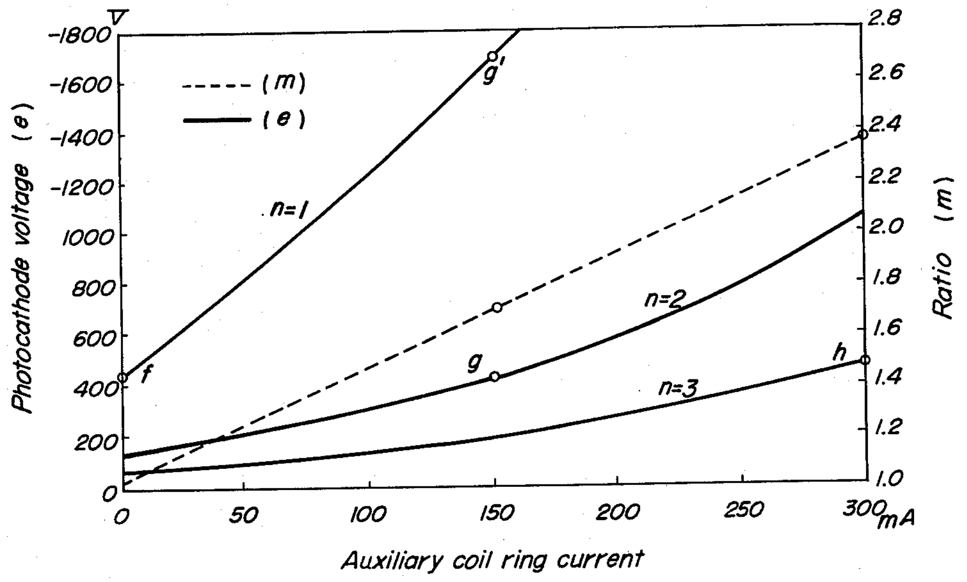

FIG. 10 illustrates the magnitude of auxiliary coil ring current for obtaining a required image magnification (assuming as a reference magnification that obtained when no current flows through the auxiliary coil ring). The chart also illustrates the photocathode voltage $e$ for the focusing modes n=1, 2 and 3. The camera tube used was a 3-inch type image orthicon and the focusing coil current was 75 ma., the annular electrodes having a voltage 0.72 times as high as that of the photocathode.

In varying the image magnification by varying the flux density, if the focusing mode degree, i.e. the number of spiral loops followed by a photoelectron, is set, for example, at $n=1$, the photocathode voltage must be changed over an extraordinarily wide range, for example, from point $f$ to point $g'$ in FIG. 10, if a more or less large magnification ratio $m$ is required each time the image magnification is discontinuously varied. It has been found, however, that any large magnification ratio can be obtained without the need of varying the electrode voltage over any wide range by operating as follows. At first, the focusing is effected at $f$ following the mode $n=1$. In increasing the auxiliary coil ring current to obtain a larger image magnification ratio, the electrode voltage is shifted stepwise to point $g$ and further to point $h$ so that the focusing modes $n=2$ and $n=3$ may be obtained in succession.

In other words, any desired magnification ratio can readily be obtained by discontinuously changing the auxiliary coil ring current in a manner such that a combination of electrode voltages suitable for a certain focusing mode is changed to another combination of electrode voltages suitable for another focusing mode.

Also according to the present invention, a permanent magnet ring may be employed as an auxiliary magnetic field generating means 25. The magnetic field generated by the permanent magnet varies the magnetic flux density and hence the configuration of the lines of magnetic force in the region of the photocathode so as to obtain a magnified image on the target as with the case of the above described auxiliary coil ring. Since the magnetic field formed by the permanent magnet ring is fixed, a magnification ratio obtained is fixed and thus it is possible to use in the optical lens system a relatively small lens of limited focal length. It goes without saying that as the magnetic flux density is varied the voltage arrangement for the electrodes within the tube must be changed accordingly. The permanent magnet ring, unlike the auxiliary coil ring, involves no heat formation due to electric current. Also, by providing a number of permanent magnet rings having magnetic fields of different intensities, the image magnification may be changed in the turret fashion while employing one and the same optical lens system.

Figures 6, 7:
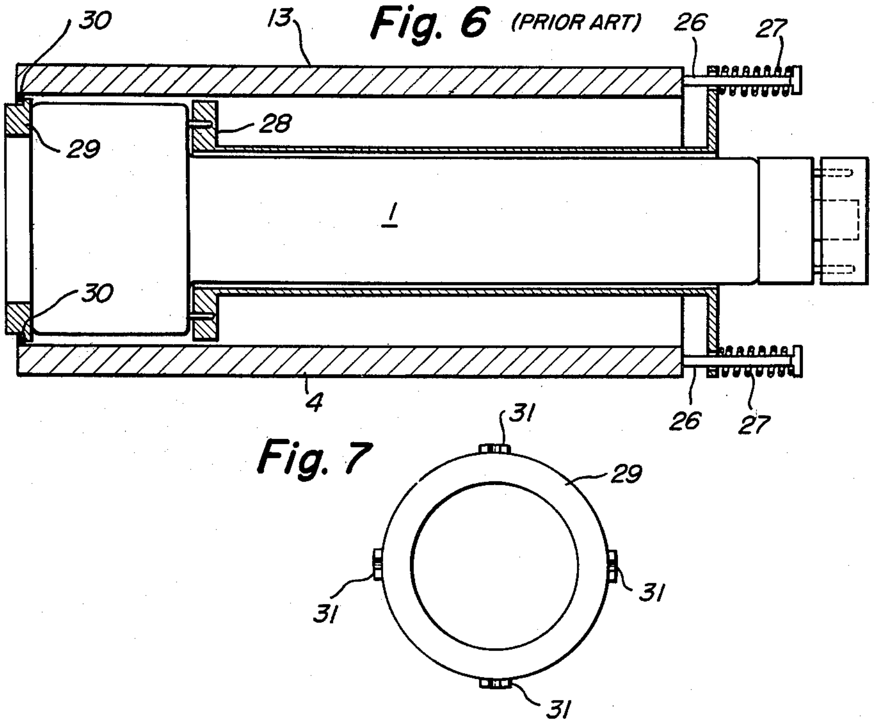
Fig. 6 (PRIOR ART), Fig. 7
FIG. 6 is a schematic view showing the manner in which the pickup tube is mounted.
FIG. 7 is a front elevational view of the auxiliary magnetic field generating ring employed according to the present invention in FIG. 6.

FIG. 6 illustrates a television pickup device including a 3-inch type image orthicon tube fixed in place by a bulb retainer ring, and FIG. 7 illustrates a retainer ring according to the present invention which takes the form of an auxiliary magnetic field generating means.

In conventional pickup devices, the bulb or envelope has been held securely in place as follows. A shouldered socket 28 is disposed inside of the focusing coil 13 as illustrated and normally biased forwardly of the focusing coil by spring means 27 arranged on rods 26 secured to the rear end portion of said focusing coil. The tube envelope has an enlarged-diameter portion carrying at the rear end spaced pins, which are fitted in the shouldered socket 28. The focusing coil has at the front end stop lugs 30 extending radially inward from the inner wall of the coil. A bulb retainer ring 29 formed of Bakelite or other nonmagnetic material is pressed against the peripheral edge of the front glass portion of the tube and held in abutting engagement with the stop lugs 30 thereby to resiliently hold the enlarged-diameter tube portion in place. It will be appreciated that, by employing the above-described auxiliary magnetic field generating means in place of a conventional tube retainer ring 29, the image magnification may readily be varied without complicating the structure of the pickup device. In this case the auxiliary magnetic field generating means is formed about its periphery with detent portions 31 like those of conventional bulb retainer rings for cooperation with the stop lugs 30 formed on the focusing coil 13 as shown in FIG. 6. With this construction, the auxiliary magnetic field generating means may readily be utilized on a television pickup device designed for use with a conventional bulb retainer ring.

The electric variation of image magnification may be performed with a fixed optical lens system but the procedure of varying the image magnification may be carried out more effectively by use of a variable optical lens system in combination with the auxiliary magnetic field generating means described above.

While the invention has been shown and described herein as embodied on a 3-inch type image orthicon tube, it is apparent to those skilled in the art that the invention may be applied likewise to any other type tubes having a photoelectronic image section, such as image intensifier tubes and image converter tubes.

What is claimed is:

1. A photoelectronic image device comprising an envelope including a photocathode adapted to emit photoelectrons, accelerating electrodes for accelerating said photoelectrons, and a target disposed opposite to said photocathode and adapted to form an image thereon upon impingement of said photoelectrons, a focussing coil encircling said envelope and generating a first magnetic field wherein photoelectrons are made to proceed along lines of magnetic force, said lines of magnetic force extending from said photocathode to said target substantially in parallel with the axis of said envelope, auxiliary magnetic field generating means arranged adjacent to the open end of said focussing coil so as to generate a second magnetic field influencing said first magnetic field between the photocathode and the target, and means supplying voltages to respective electrodes thereby to produce between said photocathode and said target an electric field substantially satisfying the equation $$n=0.0472\int_0^L \frac{H(z)}{\sqrt{E(z)}}dz$$

wherein $n$ is the number of elementary loops forming the electrons spiral path between the photocathode and the target, $z$ represents a coordinate taken along the two backs along the axis of the envelope having the origin on the photocathode, $E(z)$ represents the potential in volts measured relative to the photocathode, $H(z)$ represents the magnetic flux density in gausses and L represents the distance from the photocathode to the target in centimeters whereby the size of the image formed on the target is made variable.

2. A photoelectronic image device as defined in claim 1 wherein said target is a charge storage target on which a charge image is formed.

3. A photoelectronic image device as set forth in claim 1 wherein said auxiliary magnetic field generating means comprises coil ring means adapted for connection to a variable current supplying source.

4. A photoelectronic image device as defined in claim 1 wherein said auxiliary magnetic field generating means is a permanent magnet ring.

5. A photoelectronic image device as set forth in claim 1 further comprising means for varying the intensity of the magnetic field of said auxiliary magnetic field generating means stepwise and means for varying the potentials of the respective electrodes in accordance with said equation.

6. A photoelectronic image device comprising a photoelectron tube having an envelope including a photocathode adapted to emit photoelectrons, accelerating electrodes for accelerating said photoelectrons, and a target disposed opposite to said photocathode and adapted to form an image thereon upon impingement of said photoelectrons, a focussing coil in which said envelope is inserted and which produces between said photocathode and said target a first magnetic field, lines of magnetic force thereof being substantially in parallel with the envelope, a socket, resilient means securing the socket to an end portion of said coil to permit the socket to resiliently hold the tube, and an auxiliary magnetic field generating ring generating a second magnetic field influencing said first magnetic field, said auxiliary magnetic field generating ring being detachably mounted on said focussing coil coaxially therewith to hold said tube against said socket.

References Cited by the Examiner

UNITED STATES PATENTS

| | | | |
|---|---|---|---|
| 2,727,182 | 12/55 | Francken | 315—10 |
| 2,945,973 | 7/60 | Anderson | 315—10 X |

DAVID G. REDINBAUGH, *Primary Examiner.*

ROBERT SEGAL, *Examiner.*